(12) United States Patent
Kawashima et al.

(10) Patent No.: US 9,957,063 B2
(45) Date of Patent: May 1, 2018

(54) STRUCTURE FOR AIRCRAFT, METHOD OF MANUFACTURING STRUCTURE FOR AIRCRAFT AND METHOD OF MAKING DESIGN INFORMATION OF STRUCTURE FOR AIRCRAFT

(71) Applicant: SUBARU CORPORATION, Tokyo (JP)

(72) Inventors: Ai Kawashima, Tokyo (JP); Kousaburou Akiba, Tokyo (JP); Yasueki Komaba, Tokyo (JP); Yoshiaki Hiromatsu, Tokyo (JP); Takayuki Nishi, Tokyo (JP); Hiroyasu Fujita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 265 days.

(21) Appl. No.: 15/048,671

(22) Filed: Feb. 19, 2016

(65) Prior Publication Data
US 2016/0244182 A1     Aug. 25, 2016

(30) Foreign Application Priority Data

Feb. 23, 2015   (JP) .................................. 2015-033424

(51) Int. Cl.
*B64D 45/02*     (2006.01)
*B64C 1/12*     (2006.01)
(Continued)

(52) U.S. Cl.
CPC ................. *B64D 45/02* (2013.01); *B64C 1/12* (2013.01); *B64C 3/26* (2013.01); *B64C 3/34* (2013.01); *B64D 37/32* (2013.01)

(58) Field of Classification Search
CPC .......... B64D 45/02; B64D 37/32; B64C 1/12; B64C 3/26; B64C 3/34
See application file for complete search history.

(56) References Cited

U.S. PATENT DOCUMENTS 3,755,713 A * 8/1973 Paszkowski .......... B29C 70/885
                                                              244/1 A
3,989,984 A   11/1976 Amason et al.
(Continued)

FOREIGN PATENT DOCUMENTS

JP       02-225200 A     9/1990
JP     2009-227166 A    10/2009
(Continued)

OTHER PUBLICATIONS

Extended European Search Report EP Application No. 16156653.4 dated Jul. 15, 2016.
(Continued)

*Primary Examiner* — Christopher P Ellis
(74) *Attorney, Agent, or Firm* — McDermott Will & Emery LLP

(57) ABSTRACT

According to one implementation, a structure for an aircraft includes a first structural member, a second structural member coupled to the first structural member, a fastener and a conductive object. The fastener couples the first structural member to the second structural member. The fastener is inserted into an insertion hole formed in a portion where the first structural member is overlapped with the second structural member. The fastener is in electrically non-contact with the first and second structural members in the insertion hole. The conductive object is embedded inside at least either one of the first and second structural members. The conductive object prevents a spark between the fastener and each of the first and second structural members by forming a current pathway that leads current, flowing inside the at least either one of the first and second structural members, to the other structural member.

20 Claims, 5 Drawing Sheets

(51) Int. Cl.
*B64C 3/26* (2006.01)
*B64C 3/34* (2006.01)
*B64D 37/32* (2006.01)

(56) References Cited

U.S. PATENT DOCUMENTS

| | | | |
|---|---|---|---|
| 4,556,591 A | 12/1985 | Bannink, Jr. | |
| 4,681,497 A | 7/1987 | Berecz | |
| 4,755,904 A * | 7/1988 | Brick | B64D 45/02 244/1 A |
| 4,839,771 A * | 6/1989 | Covey | B29C 70/885 361/218 |
| 4,888,451 A | 12/1989 | Toni et al. | |
| 4,897,143 A | 1/1990 | Covey | |
| 5,461,534 A * | 10/1995 | Gondot | B64D 45/02 174/2 |
| 5,709,356 A * | 1/1998 | Avenet | B64D 45/02 244/1 A |
| 6,327,132 B1 * | 12/2001 | Andrivet | B29C 70/885 244/1 A |
| 7,236,343 B2 * | 6/2007 | Heidlebaugh | H02G 13/00 361/117 |
| 7,835,130 B2 | 11/2010 | Ware et al. | |
| 8,004,815 B2 * | 8/2011 | Loche | B64D 45/02 361/117 |
| 8,711,541 B2 * | 4/2014 | Umemoto | B64D 45/02 361/218 |
| 9,106,011 B2 * | 8/2015 | Bengtsson | H01R 4/30 |
| 9,669,942 B2 * | 6/2017 | Khosravani | B64D 45/02 |
| 2005/0213278 A1 * | 9/2005 | Hawley | B64D 45/02 361/212 |
| 2009/0001217 A1 | 1/2009 | Dufresne et al. | |
| 2009/0159306 A1 | 6/2009 | Loche et al. | |
| 2012/0074257 A1 * | 3/2012 | Bessho | B64D 45/02 244/1 A |
| 2012/0234977 A1 * | 9/2012 | Kawahara | B64C 3/34 244/131 |
| 2012/0236457 A1 * | 9/2012 | Yamakoshi | B64D 45/02 361/218 |
| 2013/0015294 A1 | 1/2013 | Motohashi | |
| 2013/0216767 A1 | 8/2013 | Cinquin | |
| 2014/0151352 A1 | 6/2014 | Burton et al. | |
| 2014/0219745 A1 | 8/2014 | Heeter et al. | |
| 2015/0377279 A1 * | 12/2015 | Tanner | B64D 45/02 29/525.02 |
| 2016/0052638 A1 | 2/2016 | Mihara et al. | |
| 2016/0297542 A1 * | 10/2016 | Khosravani | B64D 45/02 |
| 2017/0008636 A1 * | 1/2017 | Gaw | B64D 37/32 |
| 2017/0253346 A1 * | 9/2017 | Schaaf | B64C 1/00 |
| 2017/0303376 A1 * | 10/2017 | Kaste | H05F 3/02 |

FOREIGN PATENT DOCUMENTS

| | | |
|---|---|---|
| JP | 2010-540345 A | 12/2010 |
| JP | 2011-051517 A | 3/2011 |
| JP | 2011-162081 A | 8/2011 |
| JP | 2012-192752 A | 10/2012 |
| JP | 2012-206662 A | 10/2012 |
| JP | 2013-508646 A | 3/2013 |
| JP | 2014-189070 A | 10/2014 |
| WO | 2011050040 A1 | 4/2011 |

OTHER PUBLICATIONS

Decision to Grant issued in corresponding Japanese Patent Application No. 2015-033424, dated Apr. 25, 2017, with English lanuage translation.

First Office Action dated Sep. 27, 2016, in corresponding Japanese Patent Application No. 2015-033424, with English language translation.

* cited by examiner

STRUCTURE FOR AIRCRAFT, METHOD OF MANUFACTURING STRUCTURE FOR AIRCRAFT AND METHOD OF MAKING DESIGN INFORMATION OF STRUCTURE FOR AIRCRAFT

CROSS REFERENCES TO RELATED APPLICATIONS

This application is based upon and claims the benefit of priority from Japanese Patent Application No. 2015-033424, filed on Feb. 23, 2015; the entire contents of which are incorporated herein by reference.

FIELD

Implementations described herein relate generally to a structure for an aircraft, a method of manufacturing a structure for an aircraft and a method of making design information of a structure for an aircraft.

BACKGROUND

When a structure, such as a main wing, composing an airframe of an aircraft is struck by lightning, a high current flows. A typical structure of an aircraft is one in which plural panels (skins) are coupled to each other. Therefore, when an aircraft is struck by lightning, a spark may occur in a connection part of panels. Occurrence of a spark may cause scattering of molten materials due to an increase in temperature. Meanwhile, since main planes of an aircraft also generally serve as fuel tanks, it is necessary to take measures to prevent molten materials, caused by a spark, from contacting with a combustible fuel vapor.

Thus, a technique to couple panels by sandwiching a bridge layer having conductivity has been devised (for example, refer to Japanese Patent Application Publication JP H02-225200 A). According to this technique, a current flowing in a panel due to a stroke of lightning can be made to flow in another panel through a bridge layer. That is, electrical continuity between panels can be secured by a bridge layer.

Furthermore, a technique to prevent current from flowing in fasteners, for coupling a panel to a structural material, by applying an insulating sealant to the fasteners or using insulating washers and/or insulating spacers has also been devised (for example, refer to Japanese Patent Application Publication JP 2009-227166 A). In the case of applying an insulating sealant to fasteners, it is necessary to make a clearance gap for forming an insulating sealant layer between each fastener and each insertion hole. A connecting method by fitting a fastener in a state where a clearance has been formed between the fastener and an insertion hole as described above is called clearance fit.

In the case of attaching a fastener by the clearance fit, a distance between the fastener and the insertion hole is not necessarily constant. Therefore, even when the insulation property of fasteners is improved using insulating washers and/or insulating spacers, it is still difficult to certainly avoid a possibility that a spark occurs between the fasteners and a panel.

Thus, a technique to couple panels to each other, with making fasteners contact with insertion holes, has been devised (for example, refer to Japanese Patent Application Publication JP 2012-192752 A). A connecting method by fitting a fastener in a state where the fastener contacts with an insertion hole is called interference fit or transition fit. In this method, uninsulated fasteners are used as conductors for current flowing between panels to be connection targets.

However, when a method of coupling panels by fasteners to be the interference fit is adopted, the panels may be damaged due to the contact with the fasteners. In particular, since the use of a composite material as a material of a panel has advanced in recent years, it is an important problem to prevent damage to a composite panel caused by contact between the composite panel and metallic fasteners.

When a panel is opened and closed like a case of an access panel of a fuel tank, fasteners are attached and detached. Therefore, to prevent damage to a panel due to attachment and detachment of fasteners is a more important problem. Furthermore, in the case of interference fit, not only an access panel is damaged but fasteners also wear whenever the panel is opened and closed. Thereby, it is often necessary to exchange the fasteners for new fasteners in addition to repairing and exchanging the panel. Moreover, in the case of interference fit, work of attaching and detaching fasteners takes more time and effort compared to the case of the clearance fit in which a space exists between a panel and each fastener. Furthermore, in the case of interference fit, there is disadvantage that a tolerance in manufacturing error of insertion holes formed on panels to be connection targets becomes small.

As described above, when the interference fit is adopted as a method of coupling fasteners, disadvantage, such as damage to a panel, wear of fasteners, increase in labor at work of attaching and detaching fasteners, and decrease in degrees of freedom in a manufacturing error, arises. Meanwhile, when the clearance fit is adopted as a method of coupling fasteners, there is a problem that a risk of occurrence of a spark arises at the time of a stroke of lightning since non-uniformity exists in clearances between fasteners and a panel as described above.

Thus, an object of the present invention is to allow coupling panels for an aircraft under more satisfactory conditions, with preventing a spark at the time of a stroke of lightning.

SUMMARY OF THE INVENTION

In general, according to one implementation, a structure for an aircraft includes a first structural member, a second structural member, a fastener and a conductive object. The second structural member is coupled to the first structural member. The fastener couples the first structural member to the second structural member. The fastener is inserted into an insertion hole formed in a portion where the first structural member is overlapped with the second structural member. The fastener is in electrically non-contact with each of the first structural member and the second structural member in the insertion hole. At least a part of the conductive object is embedded inside at least either one of the first structural member and the second structural member. The conductive object prevents a spark between the fastener and each of the first structural member and the second structural member by forming a current pathway that leads current, flowing inside the at least either one of the first structural member and the second structural member inside which the at least the part is embedded, to the other structural member.

Further, according to one implementation, a method of manufacturing a structure for an aircraft includes: manufacturing a first structural member; manufacturing a second structural member to be coupled to the first structural member; embedding at least a part of a conductive object inside at least either one of the first structural member and the second structural member; overlapping the first structural member with the second structural member, and forming an insertion hole in a portion where the first structural member is overlapped with the second structural member; and coupling the first structural member with the second structural member by inserting the fastener into the insertion hole. The conductive object forms a current pathway that leads current, flowing inside the at least either one of the first structural member and the second structural member, to the other structural member. The conductive object prevents a spark between a fastener and each of the first structural member and the second structural member. The fastener couples the first structural member to the second structural member. The fastener is in electrically non-contact with each of the first structural member and the second structural member in the insertion hole.

Further, according to one implementation, a method of creating design information about a structure for an aircraft includes: designing a shape of a first structural member; designing a shape of a second structural member to be coupled to the first structural member; determining a position of a fastener that couples the first structural member with the second structural member; and determining a position of a conductive object of which at least a part is embedded inside at least either one of the first structural member and the second structural member. The fastener is inserted into an insertion hole formed in a portion where the first structural member is overlapped with the second structural member. The fastener is in electrically non-contact with each of the first structural member and the second structural member in the insertion hole. The conductive object prevents a spark between the fastener and each of the first structural member and the second structural member by forming a current pathway that leads current, flowing inside the at least either one of the first structural member and the second structural member inside which the at least the part of the conductive object is embedded, to the other structural member.

DETAILED DESCRIPTION

A structure for an aircraft, a method of manufacturing a structure for an aircraft and a method of making design information of a structure for an aircraft according to implementations of the present invention will be described with reference to the accompanying drawings.

(First Implementation)
(Structure and Function)

Figure 1:
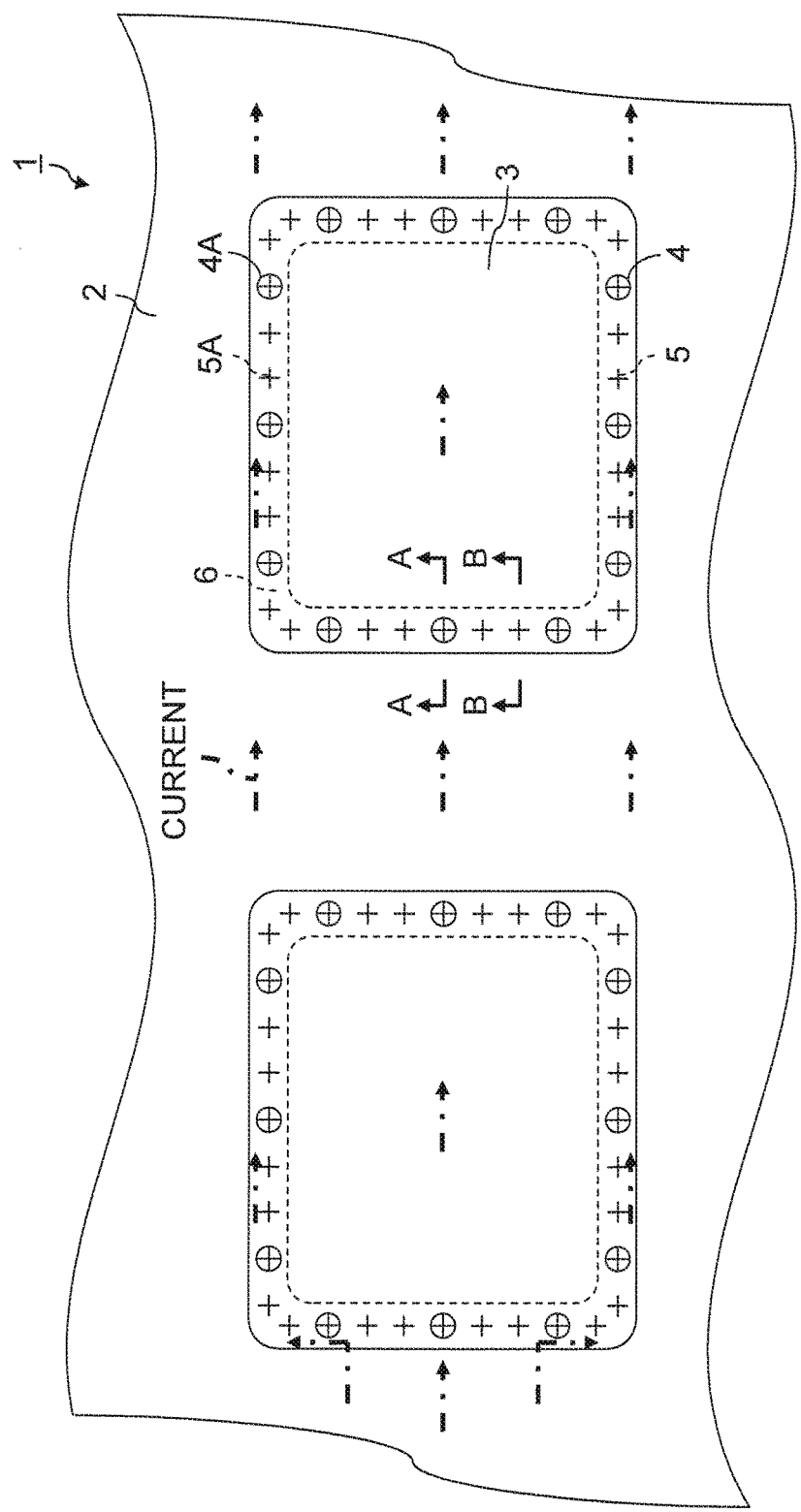
FIG. 1 is a structural view showing an example of structure for an aircraft according to the first implementation of the present invention.
Figure 2:
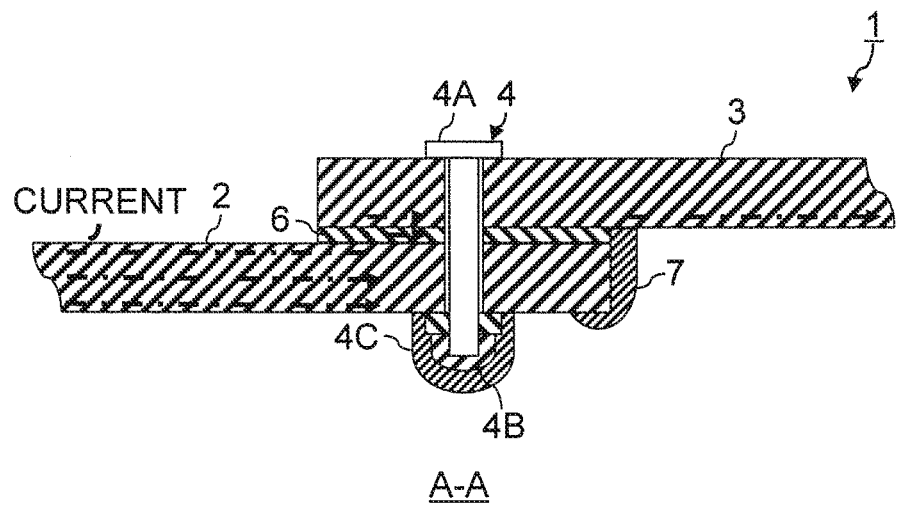
FIG. 2 is a sectional view at the position A-A showing an attachment state of a fastener shown in FIG. 1.
Figure 3:
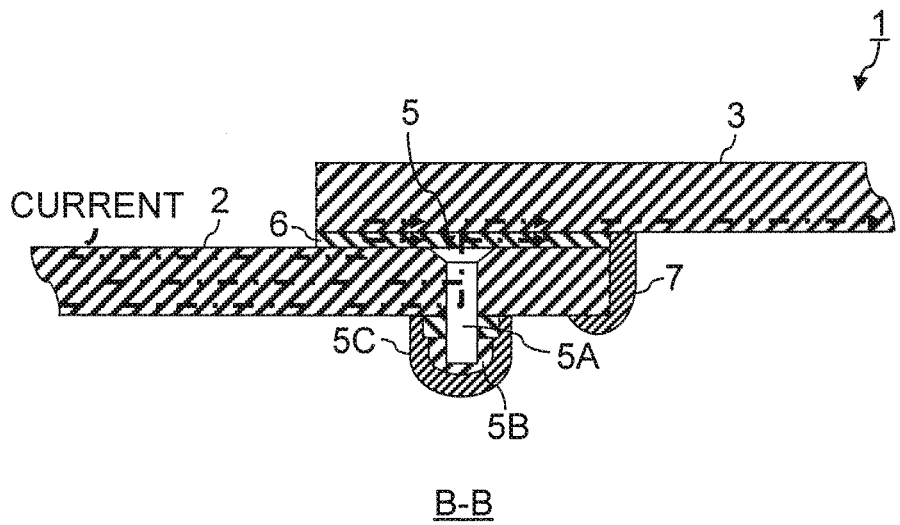
FIG. 3 is a sectional view at the position B-B showing an attachment state of a conductive object shown in FIG. 1.

FIG. 1 is a structural view showing an example of structure for an aircraft according to the first implementation of the present invention, FIG. 2 is a sectional view at the position A-A showing an attachment state of a fastener shown in FIG. 1, and FIG. 3 is a sectional view at the position B-B showing an attachment state of a conductive object shown in FIG. 1.

A structure 1 for an aircraft has at least the first structural member 2, the second structural member 3, fasteners 4, and conductive objects 5. The second structural member 3 is coupled to the first structural member 2 by the fasteners 4. Specifically, an end portion of the second structural member 3 is overlapped with an end portion of the first structural member 2. Then, insertion holes of the fasteners 4 are formed at the portion where the first structural member 2 has been overlapped with the second structural member 3. Thus, the fasteners 4 are inserted in the insertion holes formed at the portion where the first structural member 2 has been overlapped with the second structural member 3, thereby the second structural member 3 is coupled to the first structural member 2.

In particular, the fasteners 4 are inserted so that the fasteners 4 are in electrically non-contact with any of the first structural member 2 and the second structural member 3 in the insertion holes. That is, the fasteners 4 are inserted in the insertion holes to be the clearance fit. Each of the fasteners 4 can be composed of a connecting bolt 4A and a connecting nut 4B as shown in FIG. 2.

FIG. 1 shows an example case where the first structural member 2 is a panel of a main wing which also serves as a casing of a fuel tank while the second structural member 3 is each of access panels to the fuel tank. Specifically, two rectangular opening parts for accessing the fuel tank are formed on the plate first structural member 2. Each of the two opening parts formed on the first structural member 2 is closed by the plate second structural member 3 which is the access panel.

In this case, the second structural member 3 which is an access panel is often disposed in the air side, as shown in FIG. 2, so that the second structural member 3 can be opened and closed. The size of the second structural member 3 and the size of each opening of the first structural member 2 are determined so that an edge of the second structural member 3 is overlapped with an edge of the first structural member 2 to allow the second structural member 3 to be attached to and detached from the first structural member 2. Then, the second structural member 3 is coupled with the first structural member 2 by the fasteners 4 in the portion where the first structural member 2 and the second structural member 3 are overlapped with each other. That is, access panels are attached to the panel of the main wing in clearance fit by the fasteners 4.

The internal space of the first structural member 2 whose openings are closed by the second structural members 3 serves as the fuel tank. That is, the space side enclosed by the first structural member 2 and the second structural members 3 is the fuel side. Therefore, each connecting bolt 4A is inserted from the atmosphere side toward the fuel side as shown in FIG. 2 so that each of the second structural members 3 can be opened and closed. That is, each connecting bolt 4A is inserted from the second structural member 3 side to the first structural member 2 side. Therefore, the head of each connecting bolt 4A protrudes from the second structural member 3 to the atmosphere side. Meanwhile, the tip of each connecting bolt 4A protrudes from the first structural member 2 to the fuel side.

Then, the tip of each connecting bolt 4A is coupled to the connecting nut 4B in the fuel side of the first structural member 2, which is inside the fuel tank. Thereby, the first structural member 2 and each of the second structural members 3 are fixed to each other by the fasteners 4.

When the above-mentioned structure 1 for an aircraft, such as a main wing with which access panels are attached, is struck by lightning, current flows through the structure 1 for the aircraft. Not only when the first structural member 2 and the second structural members 3 are made of a metal, but also when the first structural member 2 and the second structural members 3 are made of a composite material, current flows through the surface and inside of the first structural member 2. In particular, when a composite material is CFRP (Carbon Fiber Reinforced Plastics), carbon fibers can be conductors of a lightning current.

When a lightning current propagates in the space in the structure 1 for an aircraft, a spark occurs. When a spark occurs, a part of the fasteners 4, the first structural member 2, the second structural member 3 or the like may melt and scatter due to an increase in temperature. Therefore, it is necessary to prevent occurrence of a spark. In particular, when the structure 1 for an aircraft is a wing structure which also serves as a fuel tank, it is essential to prevent melts caused by a spark from contacting with a combustible fuel vapor.

It is a gap between the fasteners 4 attached in the clearance fit and each of the first structural member 2 and the second structural member 3 that has a high risk of occurrence of a spark in the structure 1 for an aircraft. In particular, when at least one of the first structural member 2 and the second structural member 3 is made of a composite material, there is a high risk that the metallic fasteners 4 with high conductivity become paths of a lightning current.

Thus, an insulating sealant may be applied to each of the fasteners 4. Alternatively, insulating bolts each consisting of an insulating material may also be used as the fasteners 4. Thereby, occurrence of a spark, caused by a lightning current flowing into the fasteners 4 from the first structural member 2 and the second structural member 3, can be prevented to some extent.

The tips of the connecting bolts 4A protruding from the first structural member 2 to the fuel side and the connecting nuts 4B are sealed by insulation caps 4C for fasteners. As shown in FIG. 2, dome nuts are practically used as the connecting nuts 4B. In this case, the dome nuts are sealed by the insulation caps 4C for fasteners since the tips of the connecting bolts 4A are inside the dome nuts. Thereby, the fasteners 4 protruding from the first structural member 2 to the fuel side are insulated from the inside of the fuel tank.

Since the fasteners 4 are attached to the first structural member 2 and the second structural members 3 by the clearance fit, a possibility that current flows into the fasteners 4 through gaps still remains. This is because the clearance between each connecting bolt 4A, and the first structural member 2 and the second structural member 3 is uneven when the connecting bolt 4A is attached in the clearance fit, regardless of whether an insulating sealant is applied to the connecting bolt 4A. In particular, when an insulating sealant is applied to the connecting bolt 4A, a very small gap may be formed in the insertion hole after the insulating sealant has been solidified in the insertion hole.

Furthermore, when at least one of the first structural member 2 and the second structural member 3 is made of a composite material and the connecting bolts 4A used as the fasteners 4 are metallic, a risk that current flows into the connecting bolts 4A each having high electrical conductivity becomes high. Therefore, it is important to further reduce the risk that current flows into the connecting bolts 4A.

Thus, the conductive objects 5 for preventing a spark between the fasteners 4, and the first structural member 2 and the second structural members 3 are disposed in the structure 1 for an aircraft. In the example shown in the figures, the conductive objects 5 are disposed in the portions where the first structural member 2 and the second structural members 3 are overlapped with each other. More specifically, conductive bolts 5A penetrating the first structural member 2 from the second structural member 3 side, which is overlapped with the atmosphere side of the first structural member 2, toward the fuel side are disposed as the conductive objects 5.

Therefore, the heads of the conductive bolts 5A are embedded in the first structural member 2 side between the first structural member 2 and the second structural member 3. Specifically, the heads of the conductive bolts 5A inserted in insertion holes of the first structural member 2 are covered with the second structural members 3. Therefore, the heads of the conductive bolts 5A are not exposed to the atmosphere side.

Meanwhile, conductive nuts 5B are fastened to male screws formed on the tip portions of the conductive bolts 5A protruding from the first structural member 2 to the fuel side. Specifically, the conductive bolts 5A are fixed to the first structural member 2 by fastening the conductive nuts 5B to the tip portions of the conductive bolts 5A.

In this case, the tip sides of the conductive bolts 5A and the conductive nuts 5B protrude to the fuel side of the first structural member 2. Therefore, the tip sides of the conductive bolts 5A and the conductive nuts 5B are sealed by insulation caps 5C for conductors, similarly to the tip sides of the connecting bolts 4A and the connecting nuts 4B. Thereby, the tip portions of the conductive bolts 5A and the conductive nuts 5B protruding from the first structural member 2 to the fuel side are insulated from the inside of the fuel tank by the insulation caps 5C as protecting members.

It is practical to use dome nuts also for the conductive nuts 5B. Meanwhile, it is practical to use sleeve bolts for the conductive bolts 5A so that the conductive bolts 5A electrically contact with the first structural member 2 without damaging the first structural member 2.

When the above-mentioned conductive bolts 5A are disposed in the first structural member 2, current paths which lead current, flowing inside the first structural member 2, to the second structural member 3 side are formed by the conductive bolts 5A. In other words, each of the conductive bolts 5A functions as a current pathway which leads current flowing inside the first structural member 2 to the second structural member 3 side. Specifically, current flowing inside the first structural member 2 toward connected portions with the second structural members 3 can be led into the conductive bolts 5A. Then, the current can flow from the heads of the conductive bolts 5A to surface layers of the second structural members 3 in the first structural member 2 side.

Therefore, when the conductive bolts 5A are disposed as the conductive objects 5 in the first structural member 2, current flowing inside the first structural member 2 can be prevented from flowing into the connecting bolts 4A for coupling the first structural member 2 to the second structural member 3 in the clearance fit. Thereby, occurrence of a spark between the connecting bolts 4A, and the first structural member 2 and the second structural members 3 can be prevented. Then, the connecting bolts 4A can be used for coupling the first structural member 2 to the second structural member 3, without flowing current. Meanwhile, the conductive bolts 5A can be used not for coupling the first structural member 2 to the second structural member 3 but for the conductive objects 5 flowing current.

Furthermore, since the head sides of the conductive bolts 5A are covered by the second structural members 3, the head sides of the conductive bolts 5A are not exposed to the atmosphere side. Therefore, a situation where the conductive bolt 5A is struck by lightning and a high current flows through the conductive bolt 5A, which results in melting of the conductive bolt 5A, can also be avoided.

In the example shown in FIG. 1, the conductive bolts 5A are disposed at an appropriate interval between the connecting bolts 4A for attaching the access panels for the fuel tank to the main wing panel, in the portions where the access panels and the main wing panel are overlapped with each other.

In order to prevent inflow of current to the connecting bolts 4A more certainly, it is effective to dispose a conductive layer 6, contacting with the conductive objects 5, between the first structural member 2 and the second structural member 3, in addition to the conductive bolts 5A, as shown in the figures. It is practical to use a material, such as a copper foil or copper paste, which has high electrical conductivity and can be thinned, as the conductive layer 6.

In the example shown in FIG. 1, the second structural members 3 are the access panels to the fuel tank, and the portions where the first structural member 2 and the second structural members 3 are overlapped with each other have approximately rectangular ring shapes. Therefore, the ring-shaped conductive layers 6 have been disposed at the portions where the first structural member 2 and the second structural members 3 are overlapped with each other. In other words, the access panels are attached to the main panel so that the conductive layer 6 is sandwiched between each access panel and the main panel. Note that, since the connecting bolts 4A are in the clearance fit, the connecting bolts 4A do not also contact with the conductive layers 6. Therefore, the conductive layers 6 have insertion holes each having a diameter sufficiently larger than the diameter of the connecting bolts 4A so that the conductive layers 6 do not contact with the connecting bolts 4A.

When each head of the conductive bolts 5A is made to contact with the conductive layer 6 as shown in FIG. 3, current flowing inside the first structural member 2 toward the second structural member 3 side is led to the conductive layer 6 through the conductive bolts 5A. Meanwhile, current flowing in the surface layer, in the atmosphere side, of the first structural member 2 toward the second structural member 3 side is directly led to the conductive layer 6, without going through the conductive bolts 5A. That is, all current flowing in the first structural member 2 toward the second structural member 3 side can be led to the conductive layer 6.

When current is led to the conductive layer 6, a part of the current may flow into the fuel side of the second structural member 3, i.e. the surface layer, in the first structural member 2 side, of the second structural member 3. However, a large part of the current flows again into the first structural member 2 in the opposite side, toward a traveling direction of the current, through the conductive layer 6 having a high electrical conductivity. Specifically, a large part of the current flowing inside the first structural member 2 is once led to the conductive layer 6 through the conductive bolts 5A, and flows into the inside of the first structural member 2 again through the conductive bolts 5A in the opposite side toward the traveling direction of the current. That is, a large part of the current flowing in the first structural member 2 toward the second structural member 3 side bypasses the second structural member 3.

As described above, pathways of lightning current can be formed by disposing the conductive layer 6 between each access panel and the main panel, and disposing the conductive bolts 5A, which lead current flowing in the main panel side to the conductive layer 6, between the connecting bolts 4A of the access panels. In other words, electrical conductivity of the whole structure 1 for an aircraft can be improved. As a result, inflow of current into the connecting bolts 4A can be avoided more certainly.

One verge of the conductive layer 6 interposed between each access panel and the main panel faces the atmosphere side while the other verge faces the fuel side. Thus, it is desirable to seal the end of the conductive layer 6 in the fuel side by an insulator 7 as shown in the figures. Furthermore, the end of the conductive layer 6 in the atmosphere side may also be shielded by an insulator.

When the conductive layer 6 is formed between the first structural member 2 and the second structural member 3, it is important to sufficiently contact the heads of the conductive bolts 5A with the conductive layer 6, in order to form the current paths as described above. Thus, inserting the countersunk conductive bolts 5A into the first structural member 2 as exemplified in FIG. 3 can make the conductive bolts 5A electrically contact with the conductive layer 6, without the heads of the conductive bolts 5A protruding in the second structural member 3 side. That is, the conductive objects 5 can be made to electrically contact with the conductive layer 6 in a state where the conductive objects 5 have been completely embedded in the first structural member 2.

Note that, it is often difficult to accurately align positions of the heads of the countersunk conductive bolts 5A. Specifically, when the conductive bolts 5A are fastened, the heads of the conductive bolts 5A may dent from the surface of the first structural member 2. In such a case, it is appropriate to dispose shims having conductivity so that gaps are not formed between the heads of the conductive bolts 5A and the conductive layer 6.

Figure 4:
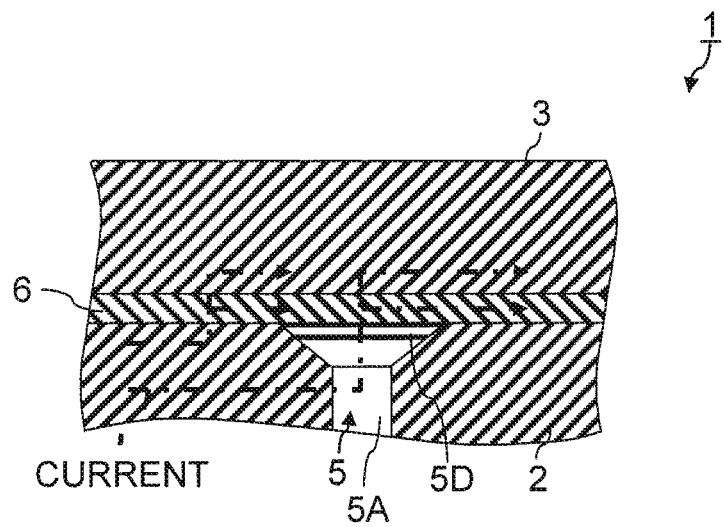
FIG. 4 shows an example of disposing a conductive shim in a gap between the conductive object and the conductive layer, which are shown in FIG. 1, in order to form a current path between the conductive object and the conductive layer.

FIG. 4 shows an example of disposing a conductive shim in a gap between the conductive object 5 and the conductive layer 6, which are shown in FIG. 1, in order to form a current path between the conductive object 5 and the conductive layer 6.

As exemplified in FIG. 4, electric continuity between the conductive bolt 5A and the conductive layer 6 can be secured by interposing a shim 5D having conductivity between the head of the conductive bolt 5A and the conductive layer 6. As a material of the shim 5D, it is practical to use a material, such as a copper foil or copper paste, which has high electrical conductivity and can be formed to a desired shape easily, similarly to the conductive layer 6.

As described above, the conductive objects 5 can certainly be made to electrically contact with the conductive layer 6 in a state where the conductive objects 5 have been completely embedded in the first structural member 2, using the conductive shims 5D and the countersunk conductive bolts 5A together. That is, the conductive objects 5 can be made to contact with the conductive layer 6, without protruding from the first structural member 2.

(Method of Making Design Information and Method of Manufacturing)

Next, a method of making design information of the structure 1 for aircraft and a method of manufacturing the structure 1 for aircraft will be described.

In the case of creating and providing design information of the structure 1 for an aircraft as exemplified in FIG. 1, a shape of the first structural member 2 including a main panel or the like is designed by a known method. Meanwhile, a shape of the second structural member 3, such as an access panel to a fuel tank, to be coupled to the first structural member 2 is also designed by a known method.

Next, positions of the fasteners 4 for coupling the first structural member 2 to the second structural member 3 are determined. The fasteners 4 are designed to be inserted into insertion holes formed in the portions where the first structural member 2 and the second structural member 3 have been overlapped with each other so that the fasteners 4 are in electrically non-contact with each of the first structural member 2 and the second structural member 3 in the insertion holes. That is, the fasteners 4 are designed as the clearance fit.

In addition, positions of the conductive bolts 5A used as the conductive objects 5 for forming current pathways which lead current flowing inside the first structural member 2 to the second structural member 3 side are determined. In other words, positions of the conductive bolts 5A for preventing a spark between the fasteners 4, and the first structural member 2 and the second structural member 3 are determined. At this time, preferably, the design information is created so as to form the conductive layer 6 between the first structural member 2 and the second structural member 3. In this case, positions of the conductive bolts 5A for forming current paths which lead current flowing inside the first structural member 2 to the conductive layer 6 in the second structural member 3 side are determined.

By such procedures, the design information of the structure 1 for an aircraft, as exemplified by FIG. 1 to FIG. 3, can be created. Then, the created design information of the structure 1 for an aircraft can be provided to an airframe maker, a parts maker or the like of an aircraft. When the design information of the structure 1 for an aircraft is created, the structure 1 for an aircraft can be manufactured according to the created design information. The structure 1 for an aircraft can be manufactured by the following procedures.

Firstly, the first structural member 2 is manufactured by a known method according to design specifications. Meanwhile, the second structural member 3 to be coupled to the first structural member 2 is also manufactured by a known method according to design specifications.

Next, the conductive objects 5 for preventing a spark between the fasteners 4, for coupling the first structural member 2 to the second structural member 3, and each of the first structural member 2 and the second structural member 3 are embedded in the first structural member 2. Specifically, the conductive bolts 5A used as the conductive objects 5 are inserted into through holes formed in the first structural member 2, and fixed by the conductive nuts 5B respectively.

Furthermore, when the tips of the conductive bolts 5A and the conductive nuts 5B protrude to the fuel side, protruding portions are insulated by the insulation caps 5C for conductors.

Next, the first structural member 2 and the second structural member 3 are overlapped with each other, and then, insertion holes of the fasteners 4 are formed in the portions where the first structural member 2 and the second structural member 3 have been overlapped with each other. At this time, preferably, the conductive layer 6, such as a copper foil, is disposed between the first structural member 2 and the second structural member 3. Then, the first structural member 2 and the second structural member 3 are coupled to each other by inserting the fasteners 4 into the insertion holes penetrating the first structural member 2 and the second structural member 3. Note that, the fasteners 4 are inserted so that the fasteners 4 are in electrically non-contact with the first structural member 2 and the second structural member 3 in the insertion holes. That is, the fasteners 4 are inserted to be the clearance fit.

An insulating sealant may be applied to the connecting bolts 4A used as the fasteners 4. The tips of the connecting bolts 4A are fixed by the connecting nuts 4B respectively. When the tips of the connecting bolts 4A and the connecting nuts 4B protrude to the fuel side, protruding portions are insulated by the insulation caps 4C for fasteners. Furthermore, when the conductive layer 6 is disposed between the first structural member 2 and the second structural member 3, and therefore, an end part of the conductive layer 6 lies in the fuel side, the end part in the fuel side of the conductive layer 6 is sealed by the insulator 7.

Thereby, the structure 1 for an aircraft as exemplified by FIG. 1 to FIG. 3 can be manufactured. Note that, when the conductive layer 6 is disposed between the first structural member 2 and the second structural member 3, and thereby, gaps are formed between the heads of the conductive bolts 5A and the conductive layer 6, the gaps can be filled by the shims 5D respectively as shown in FIG. 4.

As described above, the structure 1 for an aircraft has the conductive objects 5 which function as pathways of lightning current so that a spark due to the lightning current may not occur in each clearance formed between the fasteners 4 and each of the first structural member 2 and the second structural member 3 when the first structural member 2 and the second structural member 3 are coupled to each other by the fasteners 4 to be the clearance fit.

(Effects)

Therefore, the structure 1 for an aircraft can achieve both connection of aircraft parts in the clearance fit and prevention of a spark at a connected portion of the aircraft parts at the time of a stroke of lightning. Specifically, a spark at the time of a stroke of lightning can be avoided with also securing advantages of the clearance fit, such as avoiding damage of aircraft parts due to the fasteners 4, preventing wear of the fasteners 4, reducing labor at work of attaching and detaching the fasteners 4, and securing degrees of freedom in manufacturing error, which cannot be obtained by the interference fit.

In particular, when a connection target by the fasteners 4 is an access panel to a fuel tank, work of attaching and detaching the access panel is required after a flight operation of aircraft. Therefore, attaching an access panel in the clearance fit is important from a viewpoint of facilitating maintenance work. Specifically, when an access panel is attached to be the clearance fit, attaching and detaching the fasteners 4 becomes easy, which leads to a reduction of labor required for inspection work. Furthermore, since the fasteners 4 are not easily worn by opening and closing of an access panel, the fasteners 4 can be reused. That is, the lives of the fasteners 4 can be improved.

This is not only limited to an access panel, but it is similar in a case of coupling the second structural member 3, which requires attaching and detaching, to the first structural member 2 by the fasteners 4.

When at least one of the first structural member 2 and the second structural member 3 is made of a composite material, using the metallic fasteners 4 has a high risk that the fasteners 4 each having a high electrical conductivity become current paths. In addition, when at least one of the first structural member 2 and the second structural member 3 is a composite material, avoiding damage due to the contact with the fasteners 4 is a more important requirement.

Therefore, when a connection target by the fasteners 4 is a composite material, a risk in occurrence of a spark can be dramatically reduced by disposing the conductive objects 5 for a lightning current flowing. In addition, a risk of damage to a composite material due to contact between the fasteners 4 and the composite material can also be dramatically reduced.

(Second Implementation)

Figure 5:
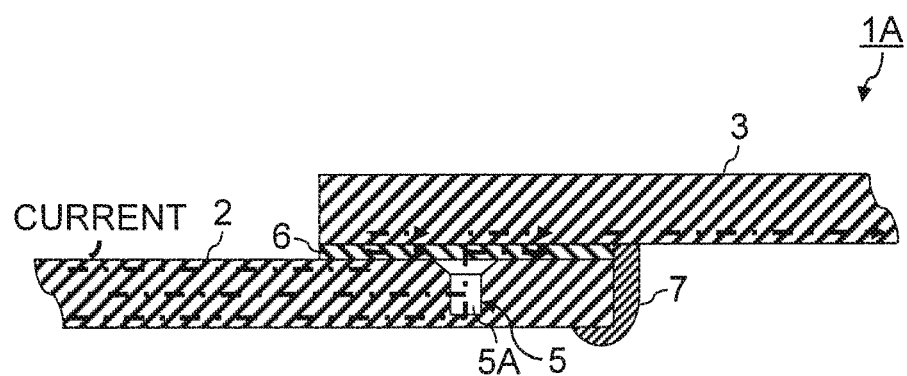
FIG. 5 is a sectional view showing a structure for an aircraft according to the second implementation of the present invention.

FIG. 5 is a sectional view showing a structure for an aircraft according to the second implementation of the present invention.

A structure 1A for an aircraft in the second implementation shown in FIG. 5 is different from the structure 1 for an aircraft in the first implementation in a point that insertion holes for inserting the conductive objects 5 into the first structural member 2 are non-through holes instead of through holes. Other features of the structure 1A for an aircraft in the second implementation are not substantially different from those of the structure 1 for an aircraft in the first implementation. Therefore, only a method of attaching the conductive objects 5 is illustrated. Then, the same elements and corresponding elements are shown by the same signs, and their explanations are omitted.

As shown in FIG. 5, each insertion hole for inserting the conductive bolt 5A, as the conductive object 5, into the first structural member 2 may also be a non-through hole (blind hole) instead of a through hole. Specifically, the conductive bolt 5A, as the conductive object 5, can be inserted into a non-through hole, whose inlet lies in the side where the first structural member 2 and the second structural member 3 are overlapped with each other, formed in the first structural member 2.

In this case, the conductive bolt 5A does not protrude from the first structural member 2. Therefore, the conductive nut 5B and the insulation cap 5C for a conductor, as shown in FIG. 3, can be omitted. When the first structural member 2 is a casing of fuel tank, the conductive object 5 can be insulated from the inside of the fuel tank more certainly.

Note that, it is practical to use bolts having no sleeve portions as the conductive bolts 5A and form female screws in the first structural member 2, in order to fix the conductive bolts 5A to the first structural member 2. The conductive bolts 5A are not attached and detached frequently, unlike the connecting bolts 4A for an access panel or the like. Therefore, damage to the first structural member 2 resulting from contact between the conductive bolts 5A and the first structural member 2 can be minimized.

(Modifications)

Figure 6:
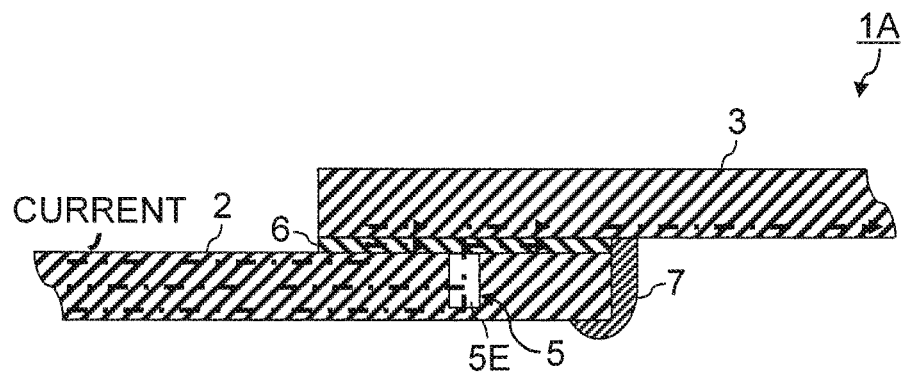
FIG. 6 is a sectional view showing a modification of the structure for aircraft in the second implementation shown in FIG. 5.

FIG. 6 is a sectional view showing a modification of the structure 1A for aircraft in the second implementation shown in FIG. 5.

Each conductive object 5 inserted into the first structural member 2 is not limited to the conductive bolt 5A, but an arbitrary object having conductivity can also be inserted as the conductive object 5. For that reason, a conductive pin 5E, such as an easily available knock pin, can also be inserted as the conductive object 5, into a non-through hole of the first structural member 2.

When the conductive pin 5E is used as the conductive object 5, the conductive pin 5E can be fixed to the first structural member 2 by press fitting of the conductive pin 5E into a non-through hole formed in the first structural member 2, without forming a female screw in the non-through hole. Specifically, the conductive pin 5E can be fixed to the first structural member 2 only by making a non-through hole in the first structural member 2 so that the tolerance of the non-through hole with respect to a diameter of the conductive pin 5E becomes an interference fit. Therefore, the number of parts of the structure 1A for an aircraft can be reduced, thereby the structure 1A for an aircraft can be simplified.

In addition, when the conductive pin 5E is made to contact with the first structural member 2 by press fitting of the conductive pin 5E into the first structural member 2, electrical contact between the conductive pin 5E and the first structural member 2 can certainly be obtained.

As a matter of course, also in a case of using the conductive pin 5E as the conductive object 5, a gap possibly formed between the conductive pin 5E and the conductive layer 6 disposed as necessary can be filled by the shim 5D having conductivity, as exemplified in FIG. 4, in order to certainly obtain electrical contact.

(Third Implementation)

Figure 7:
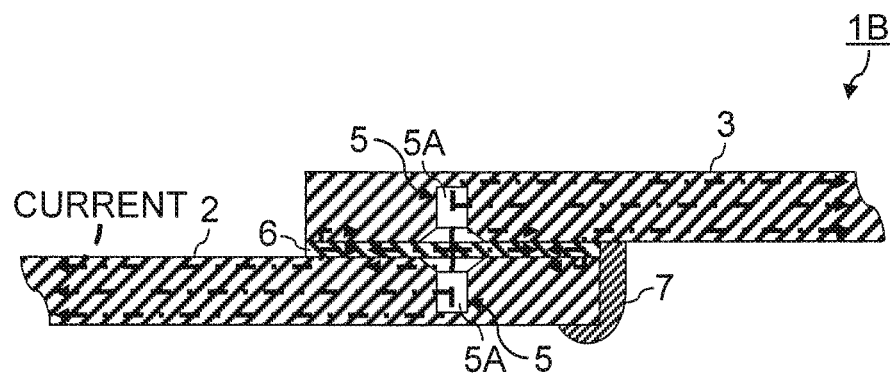
FIG. 7 is a sectional view showing a structure for an aircraft according to the third implementation of the present invention.

FIG. 7 is a sectional view showing a structure for an aircraft according to the third implementation of the present invention.

A structure 1B for an aircraft in the third implementation shown in FIG. 7 is different from the structure 1A for an aircraft in the second implementation in a point that the conductive objects 5 are disposed in both the first structural member 2 and the second structural member 3. Other features of the structure 1B for an aircraft in the third implementation are not substantially different from those of the structure 1A for an aircraft in the second implementation. Therefore, only a method of attaching the conductive objects 5 is illustrated. Then, the same elements and corresponding elements are shown by the same signs, and their explanations are omitted.

As shown in FIG. 7, the conductive objects 5 can also be disposed in each of the first structural member 2 and the second structural member 3. More specifically, the conductive bolt 5A, as the conductive object 5, has been inserted into each non-through hole whose inlet lies in the side where the first structural member 2 and the second structural member 3 are overlapped with each other, formed in each of the first structural member 2 and the second structural member 3, in the example shown in FIG. 7.

Then, the first conductive bolt 5A inserted into the first structural member 2 and the second conductive bolt 5A inserted into the second structural member 3 have been indirectly and electrically coupled to each other through the conductive layer 6. In a case of omitting the conductive layer 6, the first conductive bolt 5A and the second conductive bolt 5A are desirable to be made to directly contact and be electrically coupled with each other. When the first conductive bolt 5A and the second conductive bolt 5A are electrically coupled to each other through the conductive layer 6, it is not necessary to make a position of the central axis of the first conductive bolt 5A and a position of the central axis of the second conductive bolt 5A be on a same straight line.

As described above, when the conductive object 5 is also disposed in the second structural member 3 side, a current path for leading current from the second structural member 3 to the conductive layer 6 or the first structural member 2 can be formed even when current has flowed from the second structural member 3 toward the first structural member 2 side due to a stroke of lightning. Therefore, even when current has flowed from the second structural member 3 toward the first structural member 2 side, inflow of the current to the fasteners 4 in the clearance fit can be prevented.

Each insertion hole formed in the second structural member 3 in order to insert the second conductive bolt 5A is a non-through hole. Therefore, the tip of the second conductive bolt 5A does not protrude from the second structural member 3. Thereby, even when the surface of the second structural member 3 in the side where the second structural member 3 is not overlapped with the first structural member 2 is exposed to the atmosphere, a stroke of lightning to the second conductive bolt 5A can be avoided.

That is, it is important to prevent both the tip of the first conductive bolt 5A inserted in the first structural member 2 and the tip of the second conductive bolt 5A inserted in the second structural member, from protruding from the first structural member 2 and the second structural member 3 respectively. Therefore, both the head of the first conductive bolt 5A and the head of the second conductive bolt 5A lie in the side where the first structural member 2 and the second structural member 3 are overlapped with each other. In other words, it is appropriate to form non-through holes, which are opened in the side where the first structural member 2 and the second structural member 3 are overlapped with each other, as an insertion hole of the first conductive bolt 5A and an insertion hole of the second conductive bolt 5A, in the first structural member 2 and the second structural member 3 respectively.

(First Modification)

Figure 8:
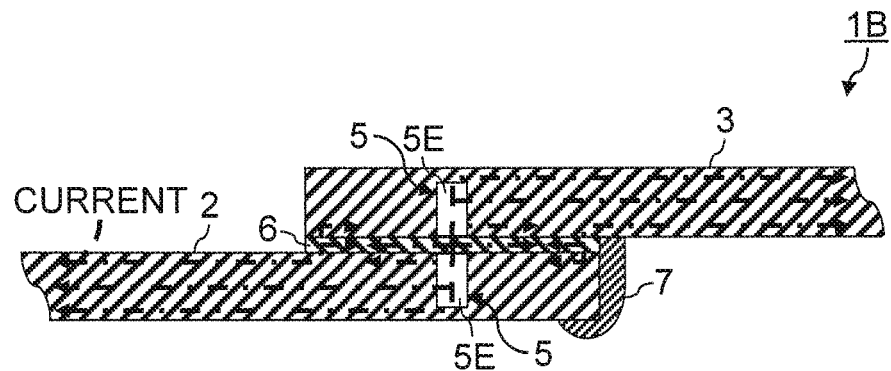
FIG. 8 is a sectional view showing the first modification of the structure for aircraft in the third implementation shown in FIG. 7.

FIG. 8 is a sectional view showing the first modification of the structure 1B for aircraft in the third implementation shown in FIG. 7.

As shown in FIG. 8, the conductive pins 5E can be used as the conductive objects 5 also in the third implementation, instead of the conductive bolts 5A. When the conductive pins 5E are used as the conductive objects 5, it is also appropriate to electrically couple the first conductive pin 5E inserted into the first structural member 2 and the second conductive pin 5E inserted into the second structural member 3 to each other, and prevent the tip of the first conductive pin 5E and the tip of the second conductive pin 5E from protruding from the first structural member 2 and the second structural member 3, respectively, similarly to the case where the conductive bolts 5A are used.

(Second Modification)

Figure 9:
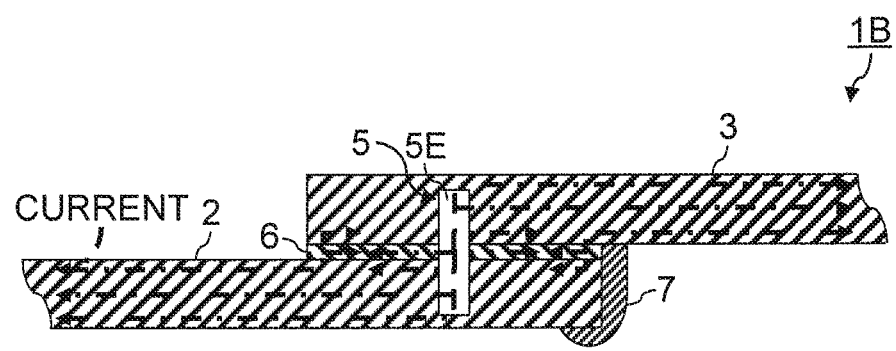
FIG. 9 is a sectional view showing the second modification of the structure for aircraft in the third implementation shown in FIG. 7.

FIG. 9 is a sectional view showing the second modification of the structure 1B for aircraft in the third implementation shown in FIG. 7.

When the conductive pins 5E are used as the conductive objects 5, the single conductive pin 5E may be inserted in the first structural member 2 and the second structural member 3 so that the conductive pin 5E strides over both the first structural member 2 and the second structural member 3. In this case, even when the conductive layer 6 has been omitted, current can be led satisfactorily to the opposed structural member, i.e. the first structural member 2 or the second structural member 3.

When the first structural member 2 or the second structural member 3 needs to be detached, the conductive pins 5E are also detached from the first structural member 2 or the second structural member 3. Therefore, it is appropriate to form insertion holes of the conductive pins 5E in the first structural member 2 or the second structural member 3 with a tolerance to an extent that the conductive pins 5E can be safely detached from the first structural member 2 or the second structural member 3 while electrical contacts between the conductive pins 5E and each of the first structural member 2 and the second structural member 3 can be kept.

Conversely, when the first structural member 2 or the second structural member 3 does not need to be detached, the single conductive pin 5E may be pressed into both the first structural member 2 and the second structural member 3. In this case, the structure 1B for an aircraft can be highly simplified.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, the respective implementations as described above may be combined with each other, or conversely some of elements may be omitted. As a specific example, the conductive objects 5 may be disposed only in the second structural member 3 depending on an applied part of a structure for an aircraft. Whether the conductive objects 5 are disposed in both the first structural member 2 and the second structural member 3, and whether the conductive objects 5 are disposed in either the first structural member 2 or the second structural member 3 can be determined according to a direction in which current may flow due to a stroke of lightning.

When an aircraft is struck by lightning, a direction in which current flows is often approximately specified. This is because lightning preferentially strikes a part, such as a wing tip, having a non-flat structure of an aircraft, in principle. For example, when a wing has been struck by lightning, current flows from the wing tip toward the fuselage side approximately in one direction. Therefore, portions, such as wing tips, where a stroke of lightning is assumed are usually designed so as to obtain resistance to lightning.

That is, how current flows at the time of a stroke of lightning changes, depending on an applied part of a structure for an aircraft, among a case where current flows only from the first structural member 2 to the second structural member 3, a case where current flows only from the second structural member 3 to the first structural member 2, and a case where current can flow from the first structural member 2 and the second structural member 3 to the other bidirectionaly.

Therefore, a target or targets in which the conductive objects 5 are to be disposed can be selected from the first structural member 2 and the second structural member 3 depending on which portion a structure for an aircraft is used for, such as a main wing, a tail plane, a center wing, or a fuselage. That is, the conductive objects 5 for preventing a spark can be disposed at arbitrary positions on a web, a flange or the like of an arbitrary structural member, such as a spar, a rib, a panel, and a stringer, which can be the upstream side of current.

Specifically, at least parts of the conductive objects 5 can be embedded inside at least one of the first structural member 2 and the second structural member 3, depending on a part to which a structure for an aircraft is applied. Thereby, current paths to lead current flowing inside at least one of the first structural member 2 and the second structural member 3, in which at least the parts of the conductive objects 5 have been embedded, to the other side can be formed.

Note that, it is important to avoid a stroke of lightning on a flat portion of an airframe. Therefore, it is appropriate to prevent the conductive objects 5 from protruding in the atmosphere side. Thus, protrusion of the conductive objects 5 in the atmosphere side can be avoided by inserting the conductive objects 5 into non-through holes, whose inlets lie in the side where the first structural member 2 and the second structural member 3 are overlapped with each other, formed in at least one of the first structural member 2 and the second structural member 3. Similarly, protrusion of the conductive objects 5 into an inside of a fuel tank can be avoided.

What is claimed is:

1. A structure for an aircraft comprising:
   a first structural member;
   a second structural member coupled to the first structural member;
   a fastener that couples the first structural member to the second structural member, the fastener being inserted into an insertion hole formed in a portion where the first structural member is overlapped with the second structural member, the fastener being in electrically non-contact with each of the first structural member and the second structural member in the insertion hole; and
   a conductive object of which at least a part is embedded inside at least either one of the first structural member and the second structural member, the conductive object preventing a spark between the fastener and each of the first structural member and the second structural member by forming a current pathway that leads current, flowing inside the at least either one of the first structural member and the second structural member inside which the at least the part is embedded, to the other structural member,
   wherein a conductive layer is disposed between the first structural member and the second structural member, the conductive layer contacting with the conductive object.

2. The structure for the aircraft according to claim 1, wherein the conductive object is disposed in the portion where the first structural member is overlapped with the second structural member.

3. The structure for the aircraft according to claim 1, wherein the at least either one of the first structural member and the second structural member, inside which the at least the part of the conductive object is embedded, is made of a composite material.

4. The structure for the aircraft according to claim 1, wherein the first structural member is a panel of a wing that serves as a casing of a fuel tank and the second structural member is an access panel to the fuel tank.

5. The structure for the aircraft according to claim 4, wherein a bolt is disposed, as the conductive object, in the portion where the first structural member is overlapped with the second structural member, the bolt penetrating the first structural member from a side of the second structural member toward a fuel side, the second structural member being overlapped with an air side of the first structural member, and
wherein the structure for the aircraft further comprises:
   a nut that fixes the bolt to the first structural member, the nut being fastened with a male screw formed on a tip portion of the bolt protruding from the first structural member to the fuel side; and
   a protecting member that insulates the tip portion of the bolt and the nut.

6. The structure for the aircraft according to claim 1, wherein a pin or a bolt is disposed as the conductive object, the pin or the bolt being inserted into a blind hole formed in the at least either one of the first structural member and the second structural member, an inlet of the blind hole being formed in a side where the first structural member is overlapped with the second structural member.

7. The structure for the aircraft according to claim 6, wherein each of a first pin or a first bolt and a second pin or a second bolt is disposed as the conductive object, the first pin or the first bolt being inserted into a first blind hole formed in the first structural member, the second pin or the second bolt being inserted into a second blind hole formed in the second structural member, each of inlets of the first and second blind holes being formed in the side where the first structural member is overlapped with the second structural member, the first pin or the first bolt being electrically coupled with the second pin or the second bolt directly or indirectly.

8. The structure for the aircraft according to claim 1, wherein the fastener is applied with an insulating sealant.

9. The structure for the aircraft according to claim 1, further comprising:
   a conductive shim disposed in a gap between the conductive object and the conductive layer, the shim forming a current pathway between the conductive object and the conductive layer.

10. A method of manufacturing a structure for an aircraft comprising:
    manufacturing a first structural member;
    manufacturing a second structural member to be coupled to the first structural member;
    embedding at least a part of a conductive object inside at least either one of the first structural member and the second structural member, the conductive object forming a current pathway that leads current, flowing inside the at least either one of the first structural member and the second structural member, to the other structural member, the conductive object preventing a spark between a fastener and each of the first structural member and the second structural member, the fastener coupling the first structural member to the second structural member;
    overlapping the first structural member with the second structural member, and forming an insertion hole in a portion where the first structural member is overlapped with the second structural member;
    coupling the first structural member with the second structural member by inserting the fastener into the insertion hole, the fastener being in electrically non-contact with each of the first structural member and the second structural member in the insertion hole; and
    disposing a conductive layer between the first structural member and the second structural member, the conductive layer contacting with the conductive object.

11. A method of making design information of a structure for an aircraft comprising:
designing a shape of a first structural member;
designing a shape of a second structural member to be coupled to the first structural member;
determining a position of a fastener that couples the first structural member with the second structural member, the fastener being inserted into an insertion hole formed in a portion where the first structural member is overlapped with the second structural member, the fastener being in electrically non-contact with each of the first structural member and the second structural member in the insertion hole;
determining a position of a conductive object of which at least a part is embedded inside at least either one of the first structural member and the second structural member, the conductive object preventing a spark between the fastener and each of the first structural member and the second structural member by forming a current pathway that leads current, flowing inside the at least either one of the first structural member and the second structural member inside which the at least the part of the conductive object is embedded, to the other structural member; and
determining to dispose a conductive layer between the first structural member and the second structural member, the conductive layer contacting with the conductive object.

12. A structure for an aircraft comprising:
a first structural member exposed to an atmosphere side;
a second structural member coupled to the first structural member;
a fastener that couples the first structural member to the second structural member, the fastener being inserted into an insertion hole formed in a portion where the first structural member is overlapped with the second structural member, the fastener being in electrically non-contact with each of the first structural member and the second structural member in the insertion hole; and
a conductive object of which at least a part is embedded inside at least either one of the first structural member and the second structural member, the conductive object preventing a spark between the fastener and each of the first structural member and the second structural member by forming a current pathway that leads current, flowing inside the at least either one of the first structural member and the second structural member inside which the at least the part is embedded, to the other structural member,
wherein the at least the part of the conductive object is embedded inside the at least either one of the first structural member and the second structural member to prevent the conductive object from being exposed to the atmosphere side.

13. The structure for the aircraft according to claim 12, wherein the conductive object is disposed in the portion where the first structural member is overlapped with the second structural member.

14. The structure for the aircraft according to claim 12, wherein the at least either one of the first structural member and the second structural member, inside which the at least the part of the conductive object is embedded, is made of a composite material.

15. The structure for the aircraft according to claim 2, wherein the at least either one of the first structural member and the second structural member, inside which the at least the part of the conductive object is embedded, is made of a composite material.

16. The structure for the aircraft according to claim 12, wherein the first structural member is a panel of a wing that serves as a casing of a fuel tank and the second structural member is an access panel to the fuel tank.

17. The structure for the aircraft according to claim 12, wherein a pin or a bolt is disposed as the conductive object, the pin or the bolt being inserted into a blind hole formed in the at least either one of the first structural member and the second structural member, an inlet of the blind hole being formed in a side where the first structural member is overlapped with the second structural member.

18. The structure for the aircraft according to claim 12, wherein the fastener is applied with an insulating sealant.

19. A method of manufacturing a structure for an aircraft comprising:
manufacturing a first structural member exposed to an atmosphere side;
manufacturing a second structural member to be coupled to the first structural member;
embedding at least a part of a conductive object inside at least either one of the first structural member and the second structural member, the conductive object forming a current pathway that leads current, flowing inside the at least either one of the first structural member and the second structural member, to the other structural member, the conductive object preventing a spark between a fastener and each of the first structural member and the second structural member, the fastener coupling the first structural member to the second structural member;
overlapping the first structural member with the second structural member, and forming an insertion hole in a portion where the first structural member is overlapped with the second structural member; and
coupling the first structural member with the second structural member by inserting the fastener into the insertion hole, the fastener being in electrically non-contact with each of the first structural member and the second structural member in the insertion hole,
wherein the at least the part of the conductive object is embedded inside the at least either one of the first structural member and the second structural member to prevent the conductive object from being exposed to the atmosphere side.

20. A method of making design information of a structure for an aircraft comprising:
designing a shape of a first structural member exposed to an atmosphere side;
designing a shape of a second structural member to be coupled to the first structural member;
determining a position of a fastener that couples the first structural member with the second structural member, the fastener being inserted into an insertion hole formed in a portion where the first structural member is overlapped with the second structural member, the fastener being in electrically non-contact with each of the first structural member and the second structural member in the insertion hole; and
determining a position of a conductive object of which at least a part is embedded inside at least either one of the first structural member and the second structural member, the conductive object preventing a spark between the fastener and each of the first structural member and the second structural member by forming a current pathway that leads current, flowing inside the at least either one of the first structural member and the second structural member inside which the at least the part of the conductive object is embedded, to the other structural member, wherein the position of the conductive object is determined to prevent the conductive object from being exposed to the atmosphere side.

\* \* \* \* \*